(12) United States Patent
Choi et al.

(10) Patent No.: US 10,394,024 B2
(45) Date of Patent: Aug. 27, 2019

(54) DISPLAY DEVICE AND DISPLAY METHOD

(71) Applicant: Samsung Display Co., Ltd., Yongin-Si, Gyeonggi-Do (KR)

(72) Inventors: Byeong-Hwa Choi, Seoul (KR); Seung-Bae Lee, Seoul (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 15/605,656

(22) Filed: May 25, 2017

(65) Prior Publication Data
US 2017/0343804 A1 Nov. 30, 2017

(30) Foreign Application Priority Data

May 27, 2016 (KR) .................. 10-2016-0065949

(51) Int. Cl.
| | | |
|---|---|---|
| *G02B 27/01* | (2006.01) | |
| *G06F 3/01* | (2006.01) | |
| *G09G 3/34* | (2006.01) | |
| *G06F 3/03* | (2006.01) | |

(52) U.S. Cl.
CPC ......... *G02B 27/0101* (2013.01); *G02B 27/01* (2013.01); *G06F 3/011* (2013.01); *G06F 3/0304* (2013.01); *G09G 3/3406* (2013.01); *G02B 2027/014* (2013.01); *G02B 2027/0118* (2013.01); *G02B 2027/0141* (2013.01); *G09G 2320/08* (2013.01); *G09G 2354/00* (2013.01); *G09G 2370/18* (2013.01)

(58) Field of Classification Search
CPC ................ G06F 3/011; G06F 3/0416; G06F 2203/04804; G09G 2300/023; G09G 2354/00
See application file for complete search history.

(56) References Cited

U.S. PATENT DOCUMENTS

| | | | | |
|---|---|---|---|---|
| 2008/0316581 | A1* | 12/2008 | Moriya | G02F 1/167 359/296 |
| 2011/0163664 | A1* | 7/2011 | Kang | H01L 27/3232 313/504 |
| 2011/0215329 | A1* | 9/2011 | Chung | H01L 51/52 257/59 |
| 2012/0092466 | A1* | 4/2012 | Choi | H04N 13/0475 348/51 |

(Continued)

FOREIGN PATENT DOCUMENTS

| | | |
|---|---|---|
| KR | 10-2011-0094367 A | 8/2011 |
| KR | 10-2012-0038439 A | 4/2012 |
| KR | 10-2014-0017934 A | 2/2014 |

*Primary Examiner* — Koosha Sharifi-Tafreshi
(74) *Attorney, Agent, or Firm* — Innovation Counsel LLP (57) ABSTRACT

A display device is disclosed. The display device may include a display panel, a light blocking member, a distance sensing member, and a controlling member. The display panel may include a pixel region and a transmission region. The light blocking member may be disposed on a rear surface of the display panel and have an adjustable light transmittance. The distance sensing member may sense a viewing distance between a viewer and the display device. The controlling member may calculate a proper viewing distance range, may compare the viewing distance with the proper viewing distance range to generate a comparison result, and may adjust the light transmittance of the light blocking member based on the comparison result.

16 Claims, 10 Drawing Sheets

(56) References Cited

U.S. PATENT DOCUMENTS

| | | | |
|---|---|---|---|
| 2012/0105424 A1* | 5/2012 | Lee | G09F 9/35 |
| | | | 345/212 |
| 2014/0035850 A1* | 2/2014 | Shin | G06F 3/041 |
| | | | 345/173 |
| 2014/0152939 A1 | 6/2014 | Kashima | |

* cited by examiner

DISPLAY DEVICE AND DISPLAY METHOD

CROSS-REFERENCE TO RELATED APPLICATION(S)

This application claims priority under 35 USC § 119 to Korean Patent Application No. 10-2016-0065949, filed on May 27, 2016 in the Korean Intellectual Property Office (KIPO), the entire disclosure of which is incorporated by reference herein.

BACKGROUND

1. Field

Example embodiments relate generally to display devices and display methods. More particularly, example embodiments relate to display devices having controllable light transmittance, and display methods for controlling light transmittance.

2. Description of the Related Art

Recently, various types of display devices have been the subject of research efforts. In particular, research on next generation display devices, such as transparent display devices, has been accelerating.

The transparent display device is a display device having a transparent property, so that the background behind the display device may be viewed through a screen of the display device. A viewer may view the background of the rear of the display device as well as information through the screen of the transparent display device. Therefore, it is possible to solve many spatial limitations of conventional display devices.

Thus, the transparent display device has various advantages compared to conventional display devices due to transparent property. However, it also has problems resulting from its transparent property. For example, the viewer may not clearly view the information on the screen due to the transparent property. Therefore, efforts exist to improve transparent display devices for more effective use.

SUMMARY

Example embodiments provide display devices for effectively displaying information.

Example embodiments provide display methods for effectively displaying information.

According to an aspect of example embodiments, a display device may include a display panel, a light blocking member, a distance sensing member, and a controlling member. The display panel may include a pixel region and a transmission region. The light blocking member may be disposed on a rear surface of the display panel, and may have an adjustable light transmittance. The distance sensing member may sense a viewing distance between a viewer and the display device. The controlling member may calculate a proper viewing distance range, may compare the viewing distance with the proper viewing distance range to generate a comparison result, and may adjust the light transmittance of the light blocking member based on the comparison result.

In example embodiments, the light blocking member may include one of a suspended particle device (SPD), a liquid crystal device (LCD), a photochromic (PC) glass, an electrochromic (EC) glass, and/or a thermochromic (LTC) glass.

In example embodiments, the light blocking member may include a first transparent substrate and a second transparent substrate facing each other, a first transparent electrode and a second transparent electrode respectively disposed on surfaces of the first transparent substrate and the second transparent substrate that face each other, and an optical modulation layer interposed between the first transparent electrode and the second transparent electrode.

In example embodiments, the proper viewing distance range may be calculated based on a height (H) of the display panel.

In example embodiments, the display device may further include a storing member storing a diagonal length (D) and an aspect ratio (w:h) of the display panel. The height (H) of the display panel may be calculated according to:

$$H = \frac{h}{\sqrt{w^2 + h^2}} \times D.$$

The variables w and the h may be components of the aspect ratio (w:h) of the display panel. The aspect ratio (w:h) may be a ratio of a width (w) and a height (h) of the display panel. The variable D may be a diagonal length of the display panel.

In example embodiments, the proper viewing distance range (R) may satisfy $0.9 \times k \times H \leq R \leq 1.1 \times k \times H$. The variable k may be greater than or equal to about 0.7 and less than or equal to about 7.5.

In example embodiments, k may be equal to about 0.75.
In example embodiments, k may be equal to about 1.5.
In example embodiments, k may be equal to about 3.
In example embodiments, k may be equal to about 7.1.

In example embodiments, the controlling member may be further configured to adjust the light transmittance of the light blocking member to a first light transmittance when the viewing distance is within the proper viewing distance range. The controlling member may also be configured to adjust the light transmittance of the light blocking member to a second light transmittance higher than the first light transmittance when the viewing distance is outside the proper viewing distance range.

According to another aspect of example embodiments, in a display method for a display device including a display panel including a pixel region and a transmission region, and a light blocking member having a variable light transmittance, a viewing distance between a viewer and the display device may be sensed, and a proper viewing distance range may be calculated. The viewing distance may be compared with the proper viewing distance range to generate a comparison result, and the light transmittance of the light blocking member may be adjusted based on the comparison result.

In example embodiments, the proper viewing distance range may be calculated based on a height (H) of the display panel.

In example embodiments, the height (H) of the display panel may be determined according to:

$$H = \frac{h}{\sqrt{w^2 + h^2}} \times D.$$

The variables w and the h may be components of an aspect ratio (w:h) of the display panel. The aspect ratio (w:h) may be a ratio of a width (w) and a height (h) of the display panel. The variable D may be a diagonal length of the display panel.

In example embodiments, the proper viewing distance range (R) may satisfy $0.9 \times k \times H \leq R \leq 1.1 \times k \times H$. The variable k may be greater than or equal to about 0.7 and less than or equal to about 7.5.

In example embodiments, k may be equal to about 0.75.

In example embodiments, k may be equal to about 1.5.

In example embodiments, k may be equal to about 3.

In example embodiments, k may be equal to about 7.1.

In example embodiments, the light transmittance of the light blocking member may be adjusted to a first light transmittance when the viewing distance is within the proper viewing distance range. The light transmittance of the light blocking member may be adjusted to a second light transmittance higher than the first light transmittance when the viewing distance is outside the proper viewing distance range.

According to example embodiments, the viewing distance and the proper viewing distance range may be compared, and the light transmittance of the light blocking member disposed on the rear surface of the display panel may be adjusted based on the compared result. Thus, visibility of the display device may be improved, and information may be displayed more effectively.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Hereinafter, display devices and display methods in accordance with example embodiments will be explained in detail with reference to the accompanying drawings. The various Figures are not necessarily to scale. All numerical values are approximate, and may vary. All examples of specific materials and compositions are to be taken as nonlimiting and exemplary only. Other suitable materials and compositions may be used instead.

Figure 1:
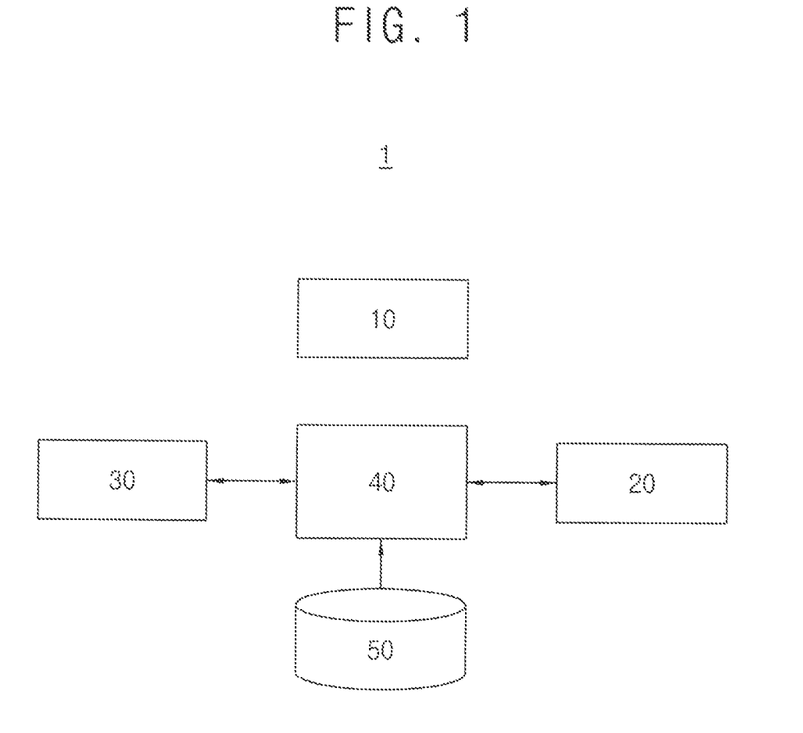
FIG. 1 is a block diagram illustrating a display device in accordance with example embodiments.

FIG. 1 is a block diagram illustrating a display device in accordance with example embodiments.

Referring to FIG. 1, a display device 1 may include a display panel 10, a light blocking member 20, a distance sensing member 30, a controlling member 40, and a storing member 50. The display panel 10 may be a transparent display panel through which external light may pass. Thus, a viewer located at the front or the rear of the display device 1 may observe an image of an object located at the rear or the front of the display device 1, respectively.

Figure 2:
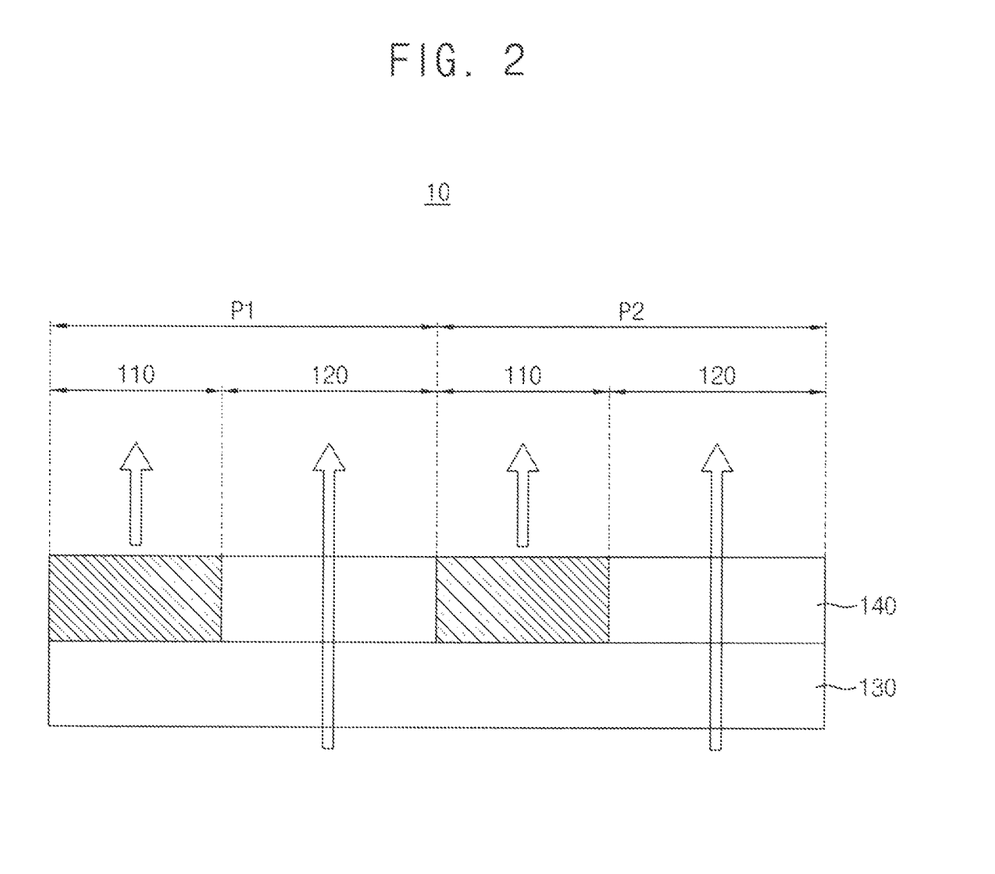
FIG. 2 is a cross-sectional view illustrating a portion of a display panel in FIG. 1.

FIG. 2 is a cross-sectional view illustrating a portion of a display panel in FIG. 1.

Referring to FIG. 2, the display panel 10 may include a substrate 130 and a display member 140. The display member 140 may be disposed on the substrate 130. External light may pass through the substrate 130 and the display member 140 in the display panel 10.

The display member 140 may include a plurality of pixels. Two such pixels P1 and P2 are illustrated in FIG. 2. Each of the pixels P1 and P2 may include a pixel region 110 and a transmission region 120. An image may be displayed from the pixel region 110, and external light may pass through the transmission region 120. In other words, each of the pixels P1 and P2 may include the pixel region 110 that displays an image and the transmission region 120 that transmits external light, so that a viewer may watch an external image from the display panel 10 when not watching an image. Here, light transmittance of the display panel 10 may be controlled by the area of the transmission region 120.

Figure 3:
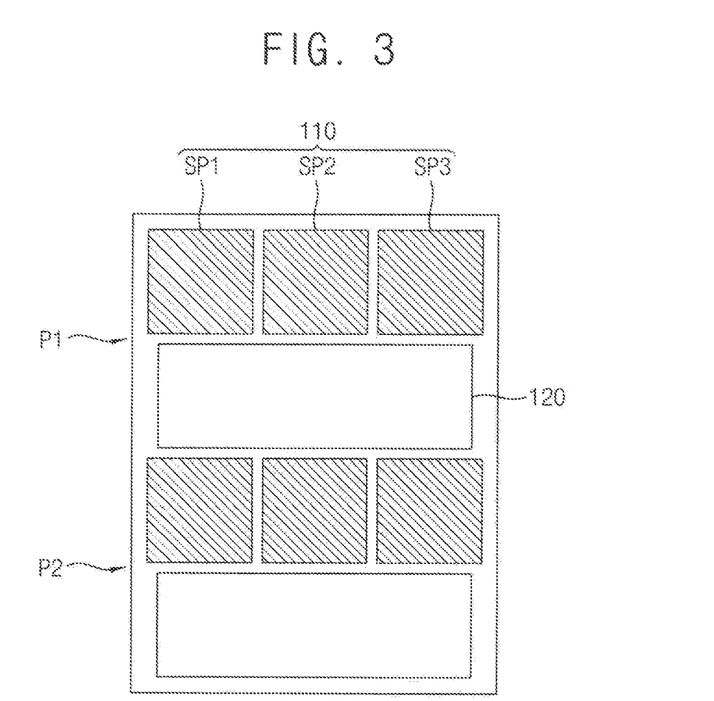
FIG. 3 is a plan view illustrating a portion of a display panel in FIG. 1.

FIG. 3 is a plan view illustrating a portion of a display panel in FIG. 1.

Referring to FIG. 3, the pixel region 110 may include a plurality of sub-pixel regions. In example embodiments, the pixel region 110 may include a first sub-pixel region SP1, a second sub-pixel region SP2, and a third sub-pixel region SP3. As one example, the first to third sub-pixel regions SP1, SP2 and SP3 may emit red light, green light and blue light, respectively. FIG. 3 illustrates that the first to third sub-pixel regions SP1, SP2 and SP3 have substantially the same areas. However, the first to third sub-pixel regions SP1, SP2 and SP3 may also have different areas from each other in order to increase light emission efficiency.

The transmission region 120 may be extended to be adjacent to the first to third sub-pixel regions SP1, SP2 and SP3. In example embodiments, the transmission region 120 may be independently provided to be patterned per each of the pixels P1 and P2. In some example embodiments, the transmission region 120 may be commonly provided to the pixels P1 and P2.

A light emitting structure and a switching structure may be disposed in the pixel region 110, and light may be emitted from the pixel region 110 based on electrical signals applied from an external source. The light emitting structure and the switching structure may be not disposed in (i.e. removed or absent from) the transmission region 120, thereby increasing light transmittance of the transmission region 120, and light transmittance of the display panel may be improved as a result. FIG. 2 illustrates a top emission display panel in which the display member 140 emits light to a top or upper surface thereof. However, the present disclosure is not limited thereto, and the present disclosure may instead be applied to a bottom emission display panel.

Referring to FIG. 1 again, the light blocking member 20 may be disposed on a rear surface of the display panel 10, and may have variable light transmittance. The light transmittance of the light blocking member 20 may be changed based on electrical signals transferred from the controlling member 40. The light blocking member 20 may transfer states (e.g., light transmittance) of the light blocking member 20 to the controlling member 40. Accordingly, the light blocking member 20 may transmit or block external light incident to the display device 1. For example, when light transmittance of the light blocking member 20 is relatively high, external light may be transferred to the display panel 10 by passing through the light blocking member 20. Also, when light transmittance of the light blocking member 20 is relatively low, external light may be blocked from the display panel 10 by the light blocking member 20.

In example embodiments, the light blocking member 20 may include a suspended particle device (SPD), a liquid crystal device (LCD), a photochromic (PC) glass, an electrochromic (EC) glass, and/or a thermochromic (LTC) glass. A detailed structure of the light blocking member 20 will be described with reference to FIG. 8 below.

The distance sensing member 30 may sense a viewing distance (d) between a viewer and the display device 1. Here, the viewing distance (d) may refer to a straight-line distance between the viewer and the display device 1. For example, the distance sensing member 30 may sense the location of a viewer by at least one of a proximity sensor, an infrared sensor, an RF sensor, and an ultrasonic sensor. The distance sensing member 30 may calculate the viewing distance (d) between the viewer and the display device 1 by using the sensed location of the viewer.

In example embodiments, the distance sensing member 30 may be installed on a front surface or a side surface of the display device 1. For example, the distance sensing member 30 may be installed on the front surface of the display device 1, and may sense the viewing distance (d) between the display device 1 and the viewer viewing the display device 1.

Figure 4:
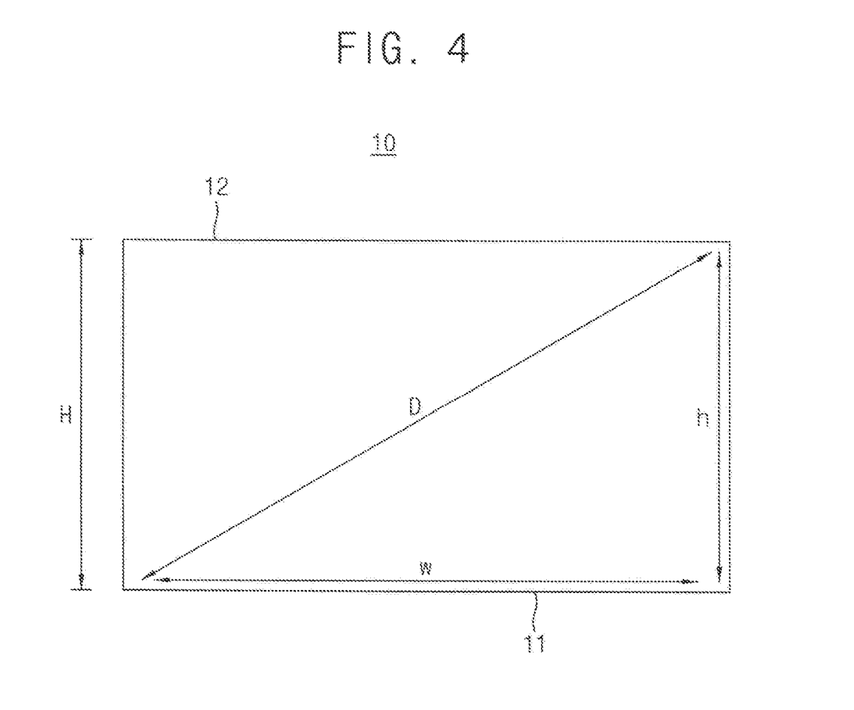
FIG. 4 is a plan view illustrating a display panel in FIG. 1.

FIG. 4 is a plan view illustrating a display panel in FIG. 1. More specifically, FIG. 4 is a plan view illustrating a display region on which an image of the display panel in FIG. 1 is displayed.

Referring to FIG. 4, the display panel 10 may have a height (H) that corresponds to a distance between a lower side 11 and an upper side 12 of the display panel 10. An aspect ratio (w:h) of the display panel 10 may be defined by a ratio of a width (w) and a height (h) of the display panel 10. For example, when the aspect ratio of the display panel 10 is 16:9, the ratio of the width and the height of the display panel 10 may be 16 to 9. Here, the height (H) and the aspect ratio (w:h) of the display panel 10 may correspond to a height and an aspect ratio of the display region on which an image is displayed in the display panel 10, respectively.

Referring to FIG. 1 again, the storing member 50 may store a diagonal length (D) and the aspect ratio (w:h) of the display panel 10 illustrated in FIG. 4. Here, the diagonal length (D) of the display panel 10 may correspond to a diagonal length of the display region. As described below, the controlling member 40 may calculate the height (H) of the display panel 10 by using the diagonal length (D) and the aspect ratio (w:h) of the display panel 10.

The controlling member 40 may calculate a proper viewing distance range (R), may compare the viewing distance (d) with the proper viewing distance range (R), and may adjust the light transmittance of the light blocking member 20 based on a compared result. Here, the proper viewing distance range (R) may refer to a range of the viewing distance (d) within which a viewer may experience a high level of visual experience and immersion when watching an image displayed by the display device 1. The proper viewing distance range (R) may be different depending on the size of the display device 1.

In example embodiments, the proper viewing distance range (R) may be calculated based on the height (H) of the display panel 10. The height (H) of the display panel 10 may be variable according to a manufacturing process of the display panel 10. However, the diagonal length (D) and the aspect ratio (w:h) of the display panel 10 may be standardized.

In example embodiments, the height (H) of the display panel 10 may be calculated by Equation 1 below.

$$H = \frac{h}{\sqrt{w^2 + h^2}} \times D \quad \text{[Equation 1]}$$

Here, H may be the height of the display panel 10, while w and h may be components of the aspect ratio (w:h) of the display panel, and D may be the diagonal length of the display panel. As described above, the diagonal length (D) and the aspect ratio (w:h) of the display panel 10 may be standardized, and the diagonal length (D) and the aspect ratio (w:h) of the display panel 10 may be stored in the storing member 50, so that the height (H) of the display panel 10 may be calculated by substituting the diagonal length (D) and the aspect ratio (w:h) of the display panel 10 into Equation 1.

In example embodiments, the proper viewing distance range (R) may satisfy 0.9×k×H≤R≤1.1×k×H. Here, k may be greater than or equal to about 0.7 and less than or equal to about 7.5, and H may be, as above, the height of the display panel 10.

The proper viewing distance range (R) may be different according to the resolution of the display panel 10. Thus, k may vary based on the resolution of the display panel 10. Here, the resolution, the number of pixels, and the proper viewing distance corresponding thereto are illustrated in Table 1 below. For example, a display panel having a 2K HD resolution may include 1920×1080 pixels in which 1920 pixels and 1080 pixels are arranged in a width direction and a height direction, respectively. Additionally, a proper viewing distance of the display panel having the 2K HD resolution may correspond to 3×H. The proper viewing distance may be different according to the resolution of the display panel because the proper viewing angle of the display panel may be different according to the resolution.

TABLE 1

| Resolution | Number of pixels (number of pixel columns × number of pixel rows) | Proper viewing distance (k × height) |
|---|---|---|
| SD (standard definition) | 720 × 576 | 7.1 × H |
| 2K HD (high definition) | 1920 × 1080 | 3 × H |
|  | 2048 × 1080 |  |
| 4K UHD (ultra high definition) | 3840 × 2160 | 1.5 × H |
|  | 4096 × 2160 |  |
| 8K UHD (ultra high definition) | 7680 × 4320 | 0.75 × H |
|  | 8192 × 4320 |  |

In example embodiments, the proper viewing distance range (R) may satisfy 0.9×k×H≤R≤1.1×k×H. Here, H may be the height of the display panel 10, and k may be about 0.75, 1.5, 3, or 7.1.

In an embodiment, the proper viewing distance may be about 7.1×H (height of the display panel) when the display panel 10 has SD resolution. Accordingly, the proper viewing distance range (R) may satisfy 0.9×7.1×H≤R≤1.1×7.1×H, which is between 90% and 110% of the proper viewing distance.

In another embodiment, the proper viewing distance may be about 3×H (height of the display panel) when the display panel 10 has 2K HD resolution. Accordingly, the proper viewing distance range (R) may satisfy $0.9 \times 3 \times H \leq R \leq 1.1 \times 3 \times H$, which is between 90% and 110% of the proper viewing distance.

In still another embodiment, the proper viewing distance may be about 1.5×H (height of the display panel) when the display panel 10 has 4K UHD resolution. Accordingly, the proper viewing distance range (R) may satisfy $0.9 \times 1.5 \times H \leq R \leq 1.1 \times 1.5 \times H$, which is between 90% and 110% of the proper viewing distance.

In still another embodiment, the proper viewing distance may be about 0.75×H (height of the display panel) when the display panel 10 has 8K UHD resolution. Accordingly, the proper viewing distance range (R) may satisfy $0.9 \times 0.75 \times H \leq R \leq 1.1 \times 0.75 \times H$, which is between 90% and 110% of the proper viewing distance.

It is described as an example that the proper viewing distance range (R) satisfies $0.9 \times k \times H \leq R \leq 1.1 \times k \times H$, and the k is about 0.75, 1.5, 3, or 7.1. However, the present disclosure is not limited thereto, and different values of k corresponding to the proper viewing distance range (R) may be applied to other resolutions besides SD, 2K HD, 4K UHD or 8K UHD.

Figure 5:
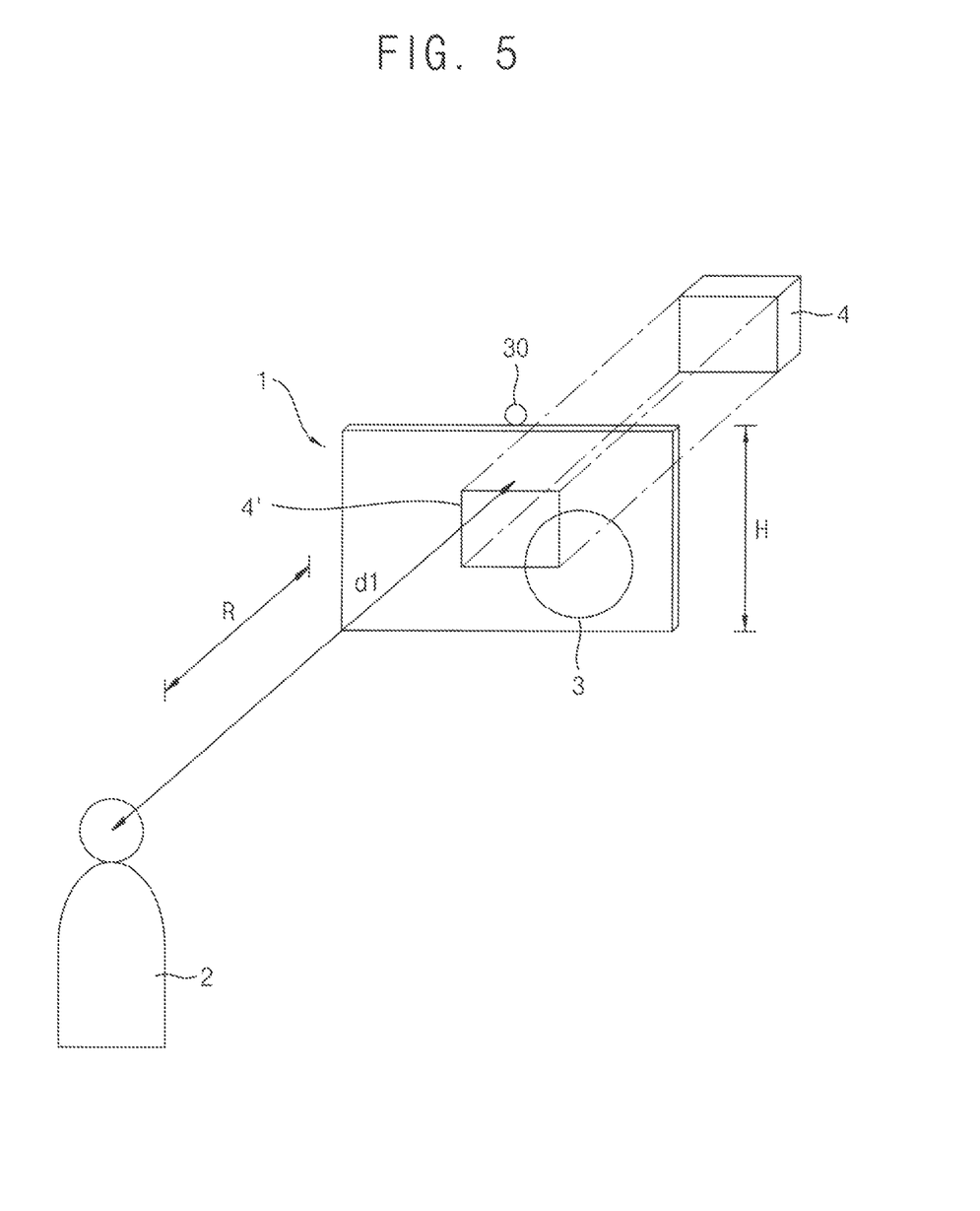
FIGS. 5, 6 and 7 are diagrams illustrating a display device in which transparency is adjusted in accordance with example embodiments.
Figure 6:
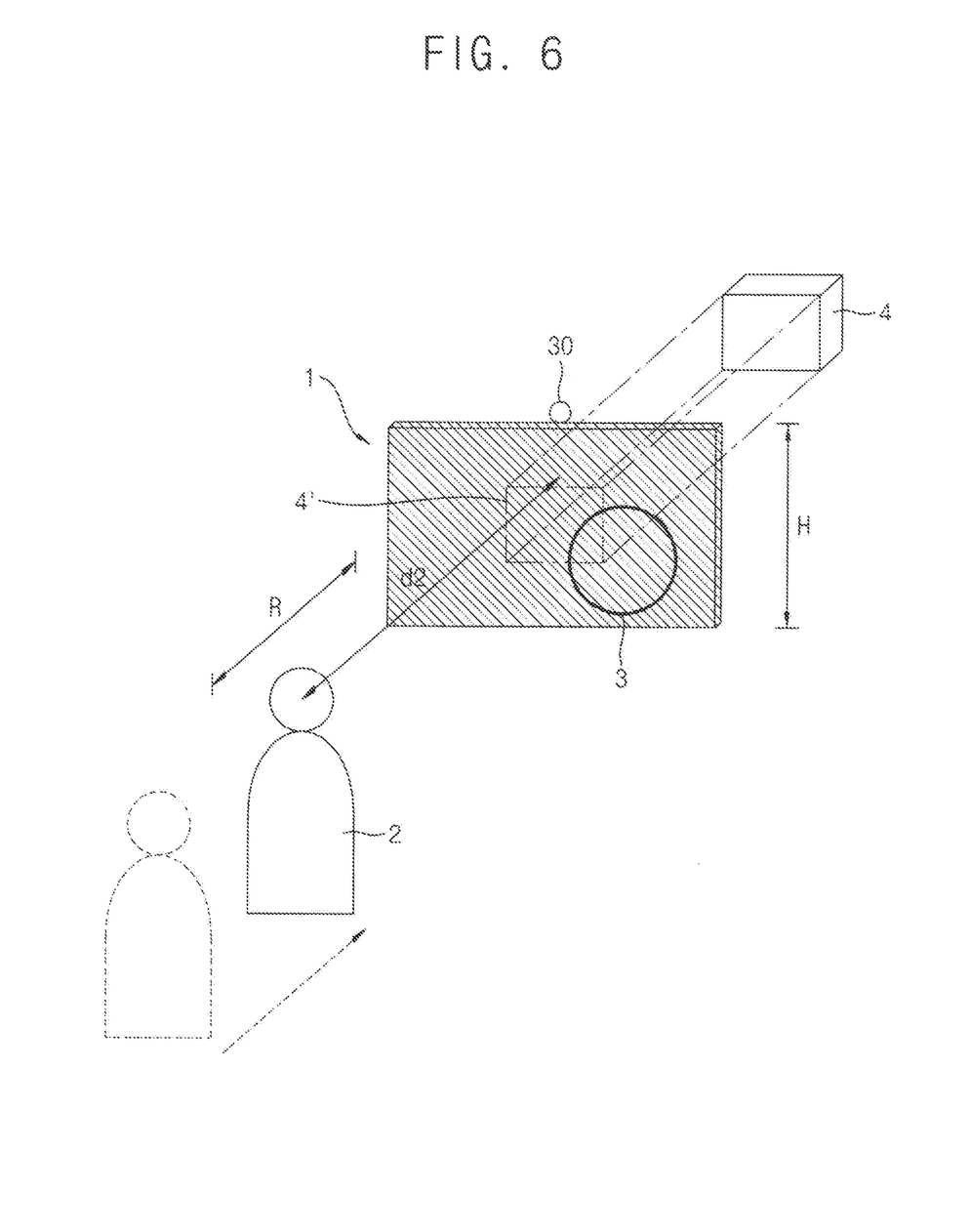
Figure 7:
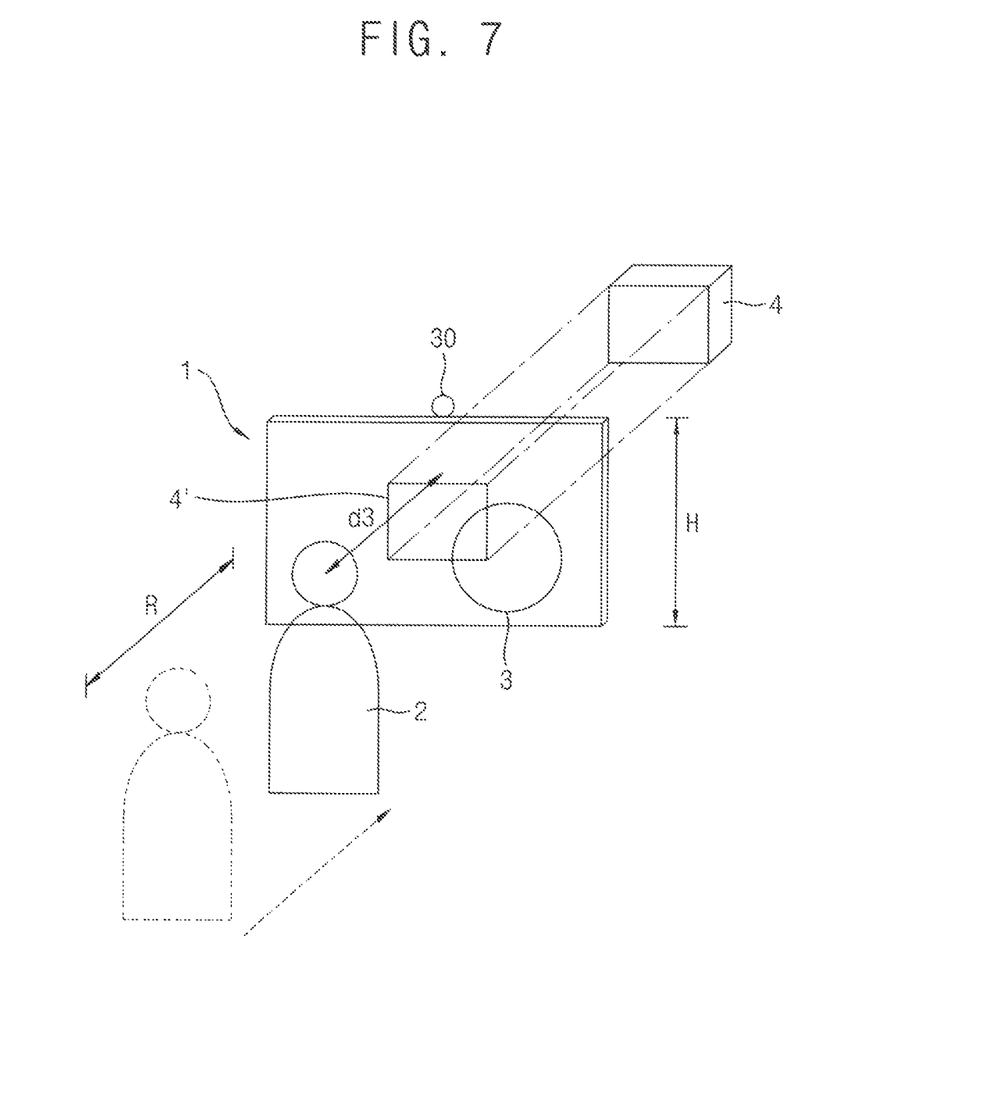

FIGS. 5, 6 and 7 are diagrams illustrating a display device of which transparency is adjusted in accordance with example embodiments.

Referring to FIGS. 5, 6 and 7, a viewer 2 may observe a contents image 3 and an object image 4' from a front surface of the display device 1. Here, the contents image 3 may represent an image composed of lights emitted from the pixels of the display device 1, and the object image 4' may represent an image composed of light reflected by an object 4 located behind display device 1, passed through the display device 1, and transferred to the viewer 2. The distance sensing member 30 may sense the viewing distance d1, d2 and d3 between the display device 1 and the viewer 2.

As illustrated in FIG. 5, when the viewing distance d1 is greater than the proper viewing distance range (R), in other words, when the viewer 2 views the display device 1 from farther than the proper viewing distance range (R), the controlling member 40 may adjust light transmittance of the light blocking member 20 to a first light transmittance. Here, the first light transmittance may be a relatively high light transmittance in which external light reflected from the object 4 may pass through the light blocking member 20. Accordingly, the viewer 2 may observe the object image 4' as well as the contents image 3 from the display device 1.

As illustrated in FIG. 6, when the viewing distance d2 is smaller than the proper viewing distance range (R), in other words, when the viewer 2 moves closer to the display device 1 to view the display device 1 from inside of the proper viewing distance range (R), the controlling member 40 may adjust light transmittance of the light blocking member 20 to a second light transmittance lower than the first light transmittance. Here, the second light transmittance may be a relatively low light transmittance in which external light reflected from the object 4 may not pass through the light blocking member 20. Accordingly, the viewer 2 may observe only the contents image 3 from the display device 1, and the visibility of the contents image 3 may be improved.

As illustrated in FIG. 7, when the viewing distance d3 is shorter than the proper viewing distance range (R), in other words, when the viewer 2 moves closer to the display device 1 to view the display device 1 from closer than the proper viewing distance range (R), the controlling member 40 may adjust light transmittance of the light blocking member 20 back to the first light transmittance. Accordingly, the viewer 2 may observe the object image 4' as well as the contents image 3 from the display device 1.

Figure 8:
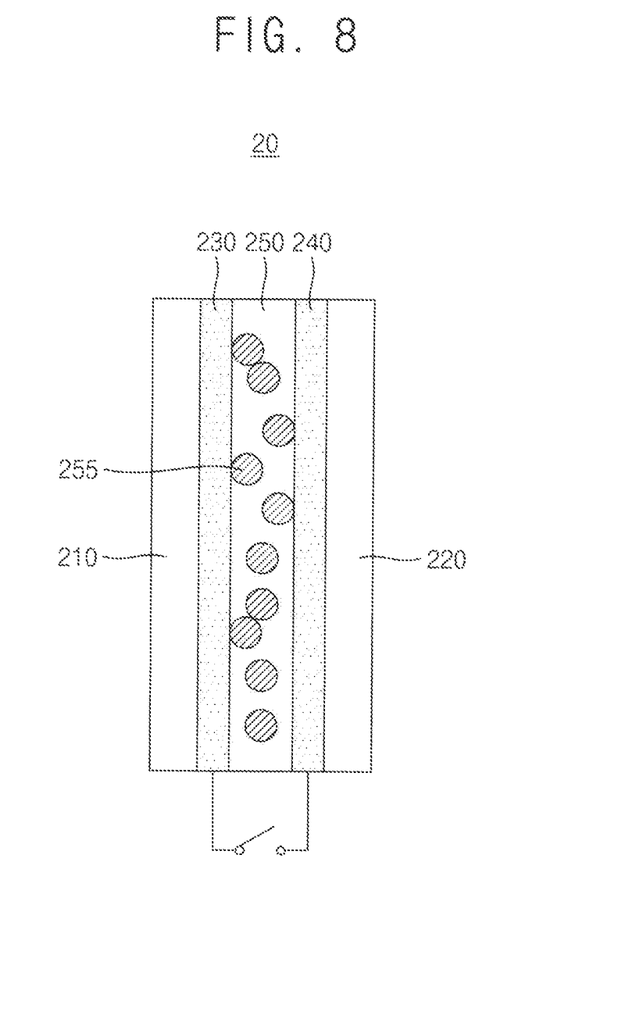
FIG. 8 is a cross-sectional view illustrating a light blocking member in FIG. 1.

FIG. 8 is a cross-sectional view illustrating a light blocking member in FIG. 1.

Referring to FIG. 8, the light blocking member 20 may include a first transparent substrate 210 and a second transparent substrate 220 opposing each other at a predetermined distance from each other, a first transparent electrode 230 and a second transparent electrode 240 respectively disposed on facing (i.e. inner) surfaces of the first transparent substrate 210 and the second transparent substrate 220, and an optical modulation layer 250 interposed between the first transparent electrode 230 and the second transparent electrode 240.

The first transparent substrate 210 and the second transparent substrate 220 may include a transparent material such as glass, silicon, synthetic resin, aerogel, etc. The first transparent electrode 230 and the second transparent electrode 240 may be formed on the first transparent substrate 210 and the second transparent substrate 220, respectively. The first transparent electrode 230 and the second transparent electrode 240 may include a transparent conductive material such as indium tin oxide (ITO), indium zinc oxide (IZO), zinc oxide (ZnO), indium gallium oxide (IGO), etc.

In example embodiments, the light modulation layer 250 may include a suspended particle device (SPD), a liquid crystal device (LCD), a photochromic (PC) glass, an electrochromic (EC) glass, and/or a thermochromic (LTC) glass. FIG. 8 illustrates an example in which the light modulation layer 250 includes a suspended particle device (SPD).

The light modulation layer 250 may include suspended particles 255. For example, the suspended particles 255 may unarranged (e.g., disordered) when electrical signals are not applied to the first transparent electrode 230 and the second transparent electrode 240, so that light may be blocked or absorbed by the light modulation layer 250. The suspended particles 255 may be arranged when electrical signals are applied to the first transparent electrode 230 and the second transparent electrode 240, so that light may pass through the light modulation layer 250.

Figure 9:
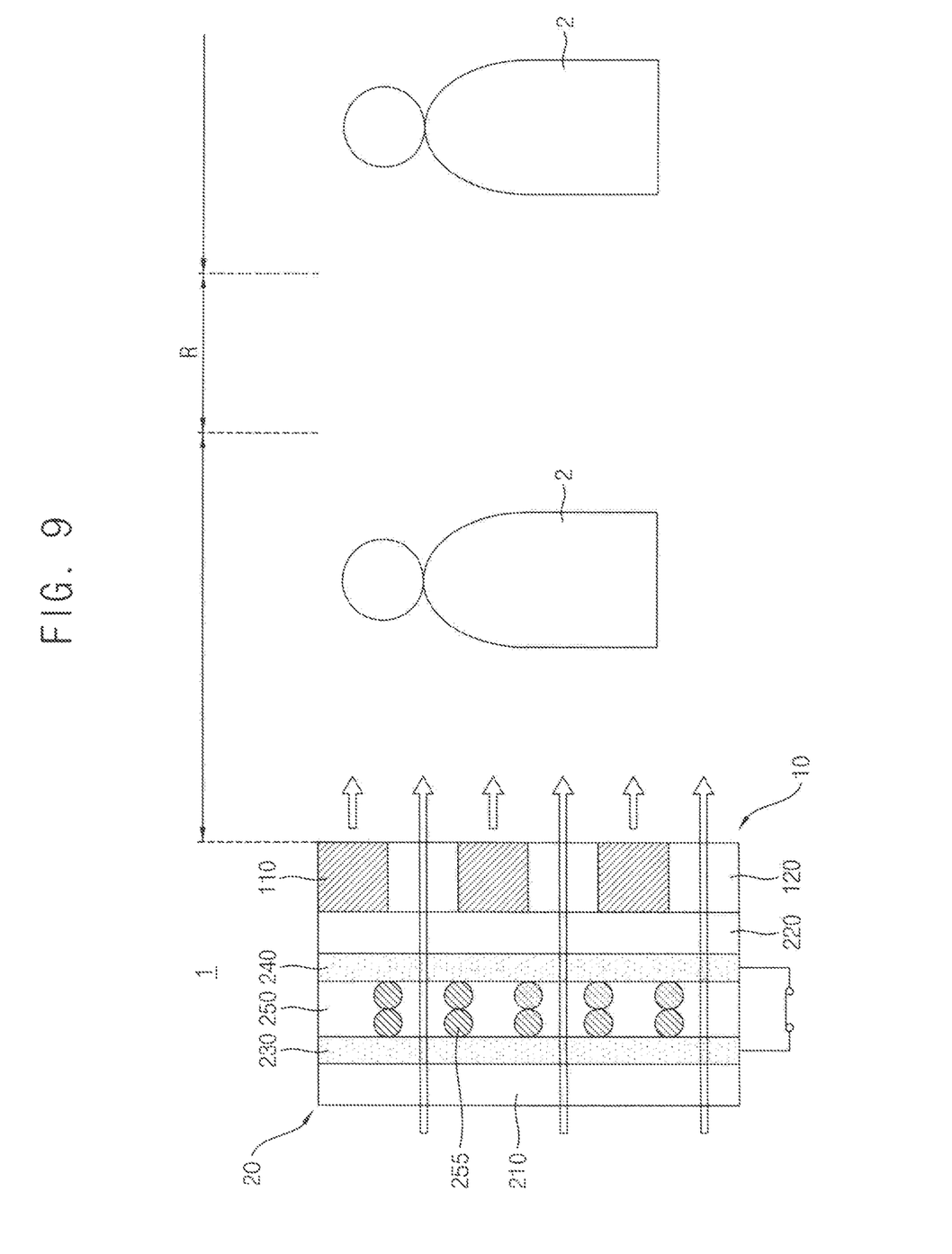
FIGS. 9 and 10 are diagrams illustrating a display device including a light blocking member of which light transmittance is adjusted in accordance with example embodiments.
Figure 10:
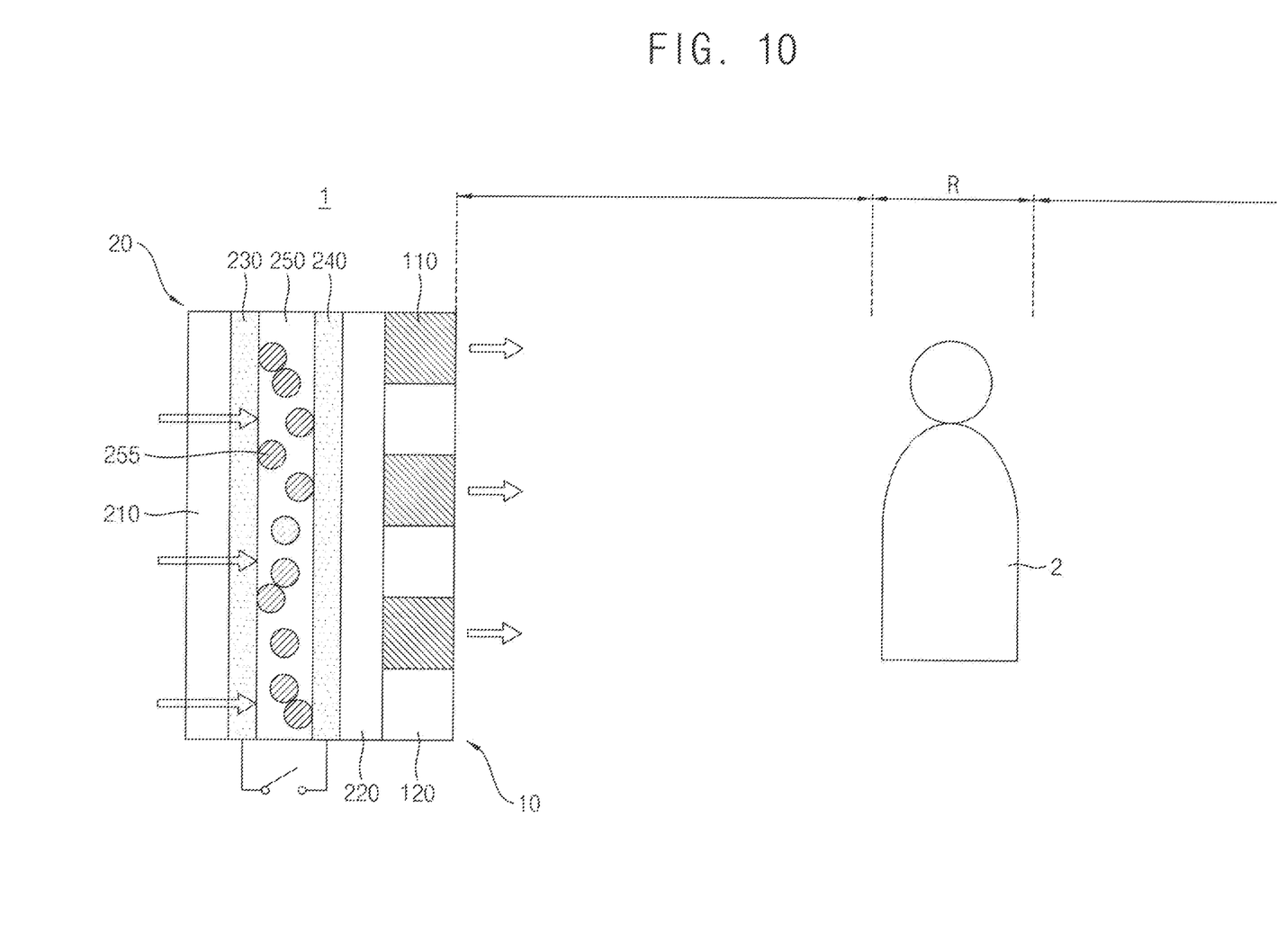

FIGS. 9 and 10 are diagrams illustrating a display device including a light blocking member of which light transmittance is adjusted in accordance with example embodiments.

Referring to FIGS. 9 and 10, the display device 1 may include the display panel 10 and the light blocking member 20 disposed on the rear surface of the display panel 10. The viewer 2 may be located in front of the display device 1. The distance sensing member 30 may sense the viewing distance (d) between the display device 1 and the viewer 2. The controlling member 40 may calculate the proper viewing distance range (R).

As illustrated in FIG. 9, the controlling member 40 may apply electrical signals to the first transparent electrode 230 and the second transparent electrode 240 when the viewer 2 is located outside the proper viewing distance range (R), e.g., closer or farther than the proper viewing distance range (R). Here, external light may pass through the light blocking member 20, and may pass through the transmission region 120 of the display panel 10 since the suspended particles 255 of the light modulation layer 250 are arranged. Therefore, light passing through the transmission region 120, as well as light emitted from the pixel region 110 of the display panel 10, may be transferred to the viewer 2.

As illustrated in FIG. 10, the controlling member 40 may not apply electrical signals to the first transparent electrode 230 and the second transparent electrode 240 when the viewer 2 is located within the proper viewing distance range (R). Here, external light may be blocked by the light blocking member 20, since the suspended particles 255 of the light modulation layer 250 are not arranged. Therefore, only light emitted from the pixel region 110 of the display panel 10 may be transferred to the viewer 2.

According to example embodiments, the display device 1 may include the transparent display panel 10, the light blocking member 20 having variable light transmittance, the distance sensing member 30 sensing the viewing distance, and the controlling member 40. The controlling member 40 calculates the proper viewing distance range to compare with the viewing distance, and adjusts the light transmittance of the light blocking member 20 based on the compared result, thereby improving the visibility of the display device 1 and displaying information more effectively.

Figure 11:
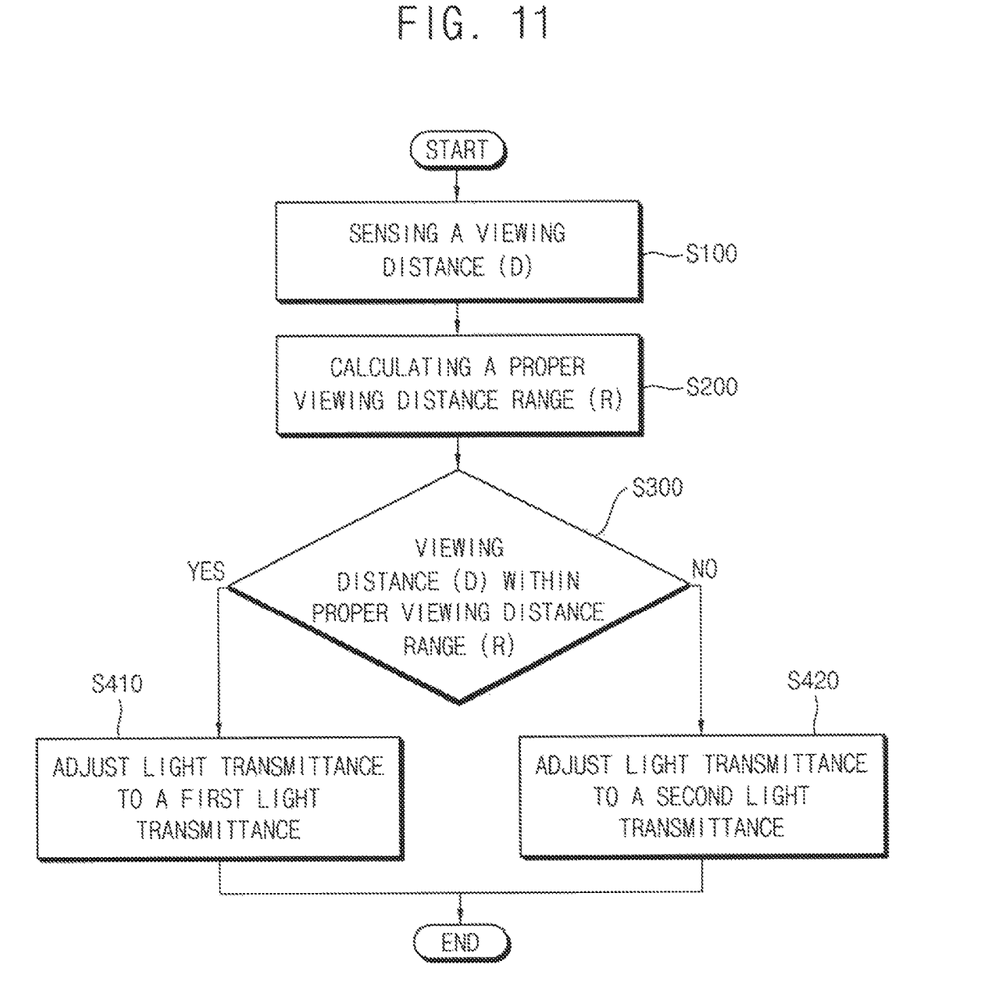
FIG. 11 is a flowchart illustrating a display method for adjusting a transparency of a display device in accordance with example embodiments.

FIG. 11 is a flowchart illustrating a display method for adjusting a transparency of a display device in accordance with example embodiments.

Referring to FIG. 11, a display device employing a display panel including a pixel region and a transmission region, and a light blocking member having variable light transmittance, may sense a viewing distance (d) between the display device and a viewer (S100). In example embodiments, the display device may sense the location of the viewer by at least one of a proximity sensor, an infrared sensor, an RF sensor, and an ultrasonic sensor. The display device may calculate the viewing distance (d) between the viewer and the display device by using the sensed location of the viewer.

The display device may calculate a proper viewing distance range (R) (S200). Here, the proper viewing distance range (R) may refer to a range of the viewing distance (d) in which a viewer may experience a high level of visual experience and immersion when watching an image displayed from the display device. The proper viewing distance range (R) may be different depending on the size of the display device.

In example embodiments, the proper viewing distance range (R) may be calculated based on a height (H) of the display panel. For example, the height (H) of the display panel may be calculated by Equation 1 above, using a diagonal length and an aspect ratio of the display panel. Here, the display device may store the diagonal length and the aspect ratio of the display panel.

In example embodiments, the proper viewing distance range (R) may satisfy 0.9×k×H≤R≤1.1×k×H. Here, k may be greater than or equal to about 0.7 and less than or equal to about 7.5, and H may be the height of the display panel. In some example embodiments, k may be about 0.75, 1.5, 3, or 7.1. The variable k may be set based on the resolution of the display device. The resolution of the display device and the proper viewing distance range (R) are explained with reference to Table 1, as above.

The display device may compare the viewing distance (d) with the proper viewing distance range (R) (S300). When the viewing distance d is within the proper viewing distance range (R), the display device may adjust light transmittance of the light blocking member to a first light transmittance (S410). For example, the first light transmittance may be a relatively low light transmittance in which external light may be blocked by the light blocking member. Accordingly, the viewer may not observe an object located behind the display device, and the visibility of the display device may be improved.

When the viewing distance d is outside the proper viewing distance range (R), e.g., closer or farther than the proper viewing distance range (R), the display device may adjust light transmittance of the light blocking member to a second light transmittance higher than the first light transmittance (S420). For example, the second light transmittance may be a relatively high light transmittance in which external light may pass through the light blocking member. Accordingly, the viewer may observe an object located behind the display device as well as an image projected by the display device.

According to example embodiments, the light transmittance of the display device may be adjusted according to the viewing distance, thereby displaying information more effectively.

The display devices and the display methods according to example embodiments may be applied to various display devices. For example, the display devices and the display methods may be applied to computers, notebooks, mobile phones, smart phones, smart pads, personal media players (PMP), personal digital assistance (PDA), MP3 players, or the likes, as well as display devices with improved light transmittance such as navigation systems for automobiles, head-up displays, or the like.

Although the display devices and the display methods in accordance with example embodiments have been described with reference to the accompanying drawings, the present invention is not limited thereto. Those skilled in the art will readily appreciate that many modifications are possible in the example embodiments without materially departing from the novel teachings and advantages of the present inventive concept. Various features of the above described and other embodiments can be mixed and matched in any manner, to produce further embodiments consistent with the invention.

What is claimed is:

1. A display device comprising:
a display panel comprising a pixel region and a transmission region;
a light blocking member disposed on a rear surface of the display panel; and
a distance sensing member configured to sense a viewing distance between a viewer and the display device,
wherein light transmittance of the light blocking member depends on a comparison result of the viewing distance and a proper viewing distance range, wherein the proper viewing distance range is defined by a first value and a second value, wherein the first value is greater than 0 and is calculated based on a height of the display panel, and wherein the second value is greater than the first value and is calculated based on the height of the display panel,
wherein the proper viewing distance range is calculated based on a calculated height (H) of the display panel, and
wherein the calculated height (H) of the display panel is calculated according to:

$$H = \frac{h}{\sqrt{w^2 + h^2}} \times D,$$

where w and h are components of an aspect ratio (w:h) of the display panel, the aspect ratio (w:h) is a ratio of a width (w) and the height (h) of the display panel, and D is a diagonal length of the display panel.

2. The display device of claim 1, wherein the light blocking member comprises one of a suspended particle device (SPD), a liquid crystal device (LCD), a photochromic (PC) glass, an electrochromic (EC) glass, and a thermochromic (LTC) glass.

3. The display device of claim 1, wherein the light blocking member comprises: a first transparent substrate and a second transparent substrate facing each other; a first transparent electrode and a second transparent electrode respectively disposed on surfaces of the first transparent substrate and the second transparent substrate that face each other; and an optical modulation layer interposed between the first transparent electrode and the second transparent electrode.

4. The display device of claim 1, wherein the light blocking member has a first light transmittance when the viewing distance is within the proper viewing distance range, and wherein the light blocking member has a second light transmittance higher than the first light transmittance when the viewing distance is outside the proper viewing distance range.

5. A display device comprising:
a display panel comprising a pixel region and a transmission region;
a light blocking member disposed on a rear surface of the display panel; and
a distance sensing member configured to sense a viewing distance between a viewer and the display device,
wherein light transmittance of the light blocking member depends on a comparison result of the viewing distance and a proper viewing distance range, wherein the proper viewing distance range is defined by a first value and a second value, wherein the first value is greater than 0 and is calculated based on a height of the display panel, and wherein the second value is greater than the first value and is calculated based on the height of the display panel,
wherein the proper viewing distance range is calculated based on a calculated height (H) of the display panel, and
wherein the proper viewing distance range (R) satisfies $0.9 \times k \times H \leq R \leq 1.1 \times k \times H$, where k is greater than or equal to 0.7 and less than or equal to 7.5.

6. The display device of claim 5, wherein k is equal to 0.75.

7. The display device of claim 5, wherein k is equal to 1.5.

8. The display device of claim 5, wherein k is equal to 3.

9. The display device of claim 5, wherein k is equal to 7.1.

10. A display method for a display device comprising a display panel comprising a pixel region and a transmission region, and a light blocking member having a variable light transmittance, the display method comprising:

sensing a viewing distance between a viewer and the display device;
calculating a proper viewing distance range, wherein the proper viewing distance range is defined by a first value and a second value, wherein the first value is greater than 0 and is calculated based on a height of the display panel, and wherein the second value is greater than the first value and is calculated based on the height of the display panel;
comparing the viewing distance with the proper viewing distance range to generate a comparison result; and
adjusting the light transmittance of the light blocking member based on the comparison result,
wherein calculating a proper viewing distance range further comprises calculating a calculated height (H) of the display panel, and
wherein the proper viewing distance range (R) satisfies $0.9 \times k \times H \leq R \leq 1.1 \times k \times H$, where k is greater than or equal to 0.7 and less than or equal to 7.5.

11. The display method of claim 10, wherein the calculated height (H) of the display panel is determined according to:

$$H = \frac{h}{\sqrt{w^2 + h^2}} \times D,$$

where w and h are components of an aspect ratio (w:h) of the display panel, the aspect ratio (w:h) is a ratio of a width (w) and the height (h) of the display panel, and D is a diagonal length of the display panel.

12. The display method of claim 10, wherein k is equal to 0.75.

13. The display method of claim 10, wherein k is equal to 1.5.

14. The display method of claim 10, wherein k is equal to 3.

15. The display method of claim 10, wherein k is equal to 7.1.

16. The display method of claim 10, wherein the adjusting further comprises adjusting the light transmittance of the light blocking member to a first light transmittance when the viewing distance is within the proper viewing distance range, and adjusting the light transmittance of the light blocking member to a second light transmittance higher than the first light transmittance when the viewing distance is outside the proper viewing distance range.

* * * * *